A. BARR & W. STROUD.
SCALE FOR RANGE FINDERS.
APPLICATION FILED JUNE 19, 1909.
940,425. Patented Nov. 16, 1909.
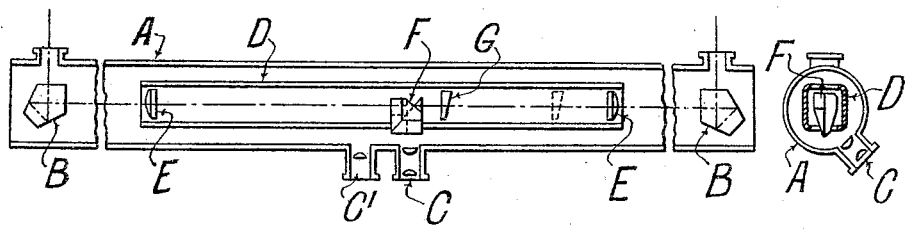
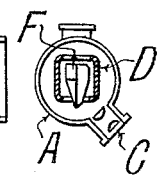
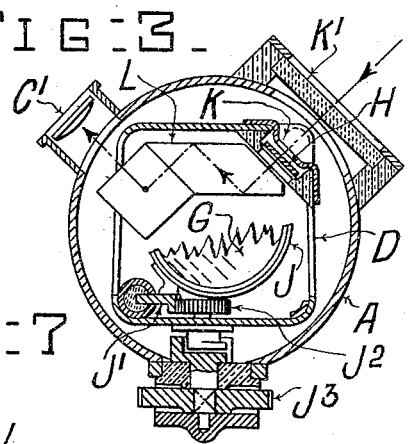
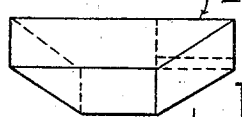
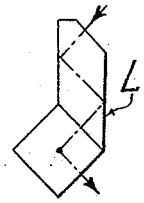
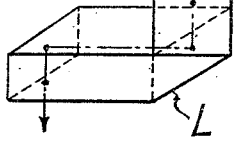
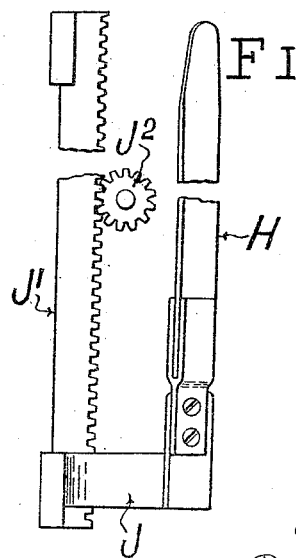
Inventors
Archibald Barr,
William Stroud
by Harold Terrell
their atty

UNITED STATES PATENT OFFICE.

ARCHIBALD BARR AND WILLIAM STROUD, OF ANNIESLAND, GLASGOW, SCOTLAND.

SCALE FOR RANGE-FINDERS.

940,425.  Specification of Letters Patent.  Patented Nov. 16, 1909.

Application filed June 19, 1909. Serial No. 503,044.

*To all whom it may concern:*

Be it known that we, ARCHIBALD BARR and WILLIAM STROUD, subjects of the King of Great Britain and Ireland, and both of Caxton street, Anniesland, Glasgow, Scotland, have invented new and useful Improvements in and Connected with Scales for Range-Finders, (for which we have made application for a patent in Great Britain, No. 13,813, or 7,786 of 1909, dated June 30, 1908,) of which the following is a specification.

This invention, which relates to improvements in and connected with range indicating scales of rangefinders, refers to means for enabling readings to be taken from opposite sides of an instrument, and, in instruments comprising a horizontally arranged scale, to means for causing the scale to appear vertical.

In the accompanying drawings, Figure 1 is a sectional plan of a rangefinder of a known general type introduced for reference in describing, by way of example, the application of improvements according to this invention, and Fig. 2 is a cross sectional view thereof. Fig. 3 is a cross sectional view of a rangefinder, Fig. 4 is a plan of a scale and associated parts. Figs. 5, 6, and 7 are views illustrating a system of reflecting prisms for viewing the scale.

The rangefinder illustrated at Figs. 1 and 2, comprises an outer casing A, carrying end reflectors B, B, of the optical square type and eyepieces C, $C^1$, and D designates an inner frame supported within the casing A, preferably in such a manner that it will not be sensibly deformed by forces applied to the outer casing during use, carrying at its ends objectives E, E, and near its center eyepiece prisms F, and fitted with a deflecting prism G.

In the example of construction illustrated, a scale H is provided, carried by a rim J mounted upon a rack $J^1$, which is adapted to be moved along the inner frame, D, by means of a pinion $J^2$ which in the example of construction illustrated is journaled on the underside of the inner frame so that it may be actuated from the exterior of the outer casing A by a working head $J^3$. The rim J may be furnished with a deflecting prism G for use in the operation of a rangefinder of the type illustrated in Figs. 1 and 2.

An example of means according to this invention to permit readings to be taken from opposite sides of the instrument, and for causing a horizontally arranged scale to appear vertical, will now be described with reference to Figs. 3, 5, 6 and 7. In the form of construction illustrated, the scale H, preferably formed of translucent material, ivory being suitable, is arranged within a guide below an aperture K, formed in one of the upper corners of the inner frame D, over which a window $K^1$ in the outer casing A is provided. For the purpose of reading the scale from the side of the instrument opposite to the window $K^1$, a system of reflecting prisms L is provided, the outer casing having an eyepiece $C^1$, for the observer's use.

In one form of construction a system of prisms or mirrors is provided for the purpose of causing the scale to appear vertical instead of horizontal as it really is. In the example illustrated, a system of prisms is shown comprising reflecting surfaces at which the light coming from the under surface of the scale H is reflected in a vertical plane and then in a horizontal plane and finally projected through the eyepiece $C^1$, which in the construction illustrated is inclined at 45° or thereby to the plane of triangulation.

In order to permit readings of the scale to be made from the side of the instrument opposite to the eyepiece $C^1$, the upper as well as the under side of the scale H is graduated so that observations may be made through the window $K^1$ as well as through the eyepiece $C^1$. By causing the scale to appear to move vertically a more convenient form of marking can be adopted than is possible with a scale presented to view horizontally, and it allows the markings indicating higher ranges to appear above lower ones, so that there is less liability of misreading the range indicated.

What we do claim as our invention, and desire to secure by Letters Patent, is:—

1. A rangefinder having a horizontally arranged scale and means for causing the scale to appear vertical.

2. A rangefinder having a horizontally arranged scale, a system of reflectors and an eyepiece for causing the scale when viewed therethrough to appear vertical.

3. A rangefinder having a horizontally arranged scale, a system of reflecting prisms and an eye-piece for causing the scale to appear vertical.

4. A rangefinder having a horizontally arranged scale, a system of reflecting prisms, and an eyepiece inclined at about 45° to the plane of triangulation, for the purposes set forth.

5. A range finder having a horizontally arranged scale graduated on the upper and under sides, and an outer casing provided with a window beneath which the said horizontally arranged scale is located, in combination with an eye-piece at the opposite side of the casing and a system of reflectors for causing the scale when viewed through the eye-piece to appear vertical, for the purposes set forth.

6. A rangefinder having a horizontally arranged scale graduated on the upper and under sides, and an outer casing provided with a window beneath which the said horizontally arranged scale is located, in combination with an eye-piece at the opposite side of the casing and a system of reflectors introduced between the under side of the scale and the eye-piece, for the purposes set forth.

7. A rangefinder having a horizontally arranged scale graduated on the upper and under sides, and an outer casing provided with a window beneath which the said horizontally arranged scale is located, in combination with an eye-piece at the opposite side of the casing and a system of reflectors introduced between the under side of the scale and the eye-piece, for the purposes set forth.

8. A rangefinder having a horizontally arranged scale graduated on the upper and under sides, and an outer casing provided with a window beneath which the said horizontally arranged scale is located, in combination with an eye-piece at the opposite side of the casing and a system of reflecting prisms introduced between the under side of the scale and the eye-piece, for the purposes set forth.

9. A rangefinder having a horizontally arranged scale graduated on the upper and under sides, and an outer casing provided with a window beneath which the said horizontally arranged scale is located, in combination with an eye-piece, inclined at about 45° to the plane of triangulation, at the opposite side of the casing and a system of reflectors introduced between the under side of the scale and the eye-piece, for the purposes set forth.

In testimony whereof we have signed our names to this specification in the presence of two subscribing witnesses.

ARCHIBALD BARR.
WILLIAM STROUD.

Witnesses:
V. H. PORTER,
GEO. H. STEVENSON.